(12) United States Patent
Goldenberg et al.

(10) Patent No.: US 7,446,752 B2
(45) Date of Patent: Nov. 4, 2008

(54) CONTROLLING HAPTIC SENSATIONS FOR VIBROTACTILE FEEDBACK INTERFACE DEVICES

(75) Inventors: Alex S. Goldenberg, Mountain View, CA (US); Ramon Alarcon, Santa Clara, CA (US)

(73) Assignee: Immersion Corporation, San Jose, CA (US)

( * ) Notice: Subject to any disclaimer, the term of this patent is extended or adjusted under 35 U.S.C. 154(b) by 730 days.

(21) Appl. No.: 10/671,465

(22) Filed: Sep. 29, 2003

(65) Prior Publication Data

US 2004/0056840 A1 Mar. 25, 2004

Related U.S. Application Data

(63) Continuation of application No. 09/669,029, filed on Sep. 25, 2000, now abandoned.

(60) Provisional application No. 60/156,354, filed on Sep. 28, 1999.

(51) Int. Cl.
*G09G 5/00* (2006.01)
(52) U.S. Cl. .............................. 345/156; 310/81; 310/15
(58) Field of Classification Search ................. 345/156; 310/81, 15, 130, 40; 463/44
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,046 A | 11/1971 | Scourtes | |
| 3,623,064 A | 11/1971 | Kagan | |
| 3,902,687 A | 9/1975 | Hightower | |
| 3,903,614 A | 9/1975 | Diamond et al. | |
| 3,911,416 A | 10/1975 | Feder | |

(Continued)

FOREIGN PATENT DOCUMENTS

EP 0265011 4/1988

(Continued)

OTHER PUBLICATIONS

Russo, Massimo Andrea, "The Design and Implementation of a Three Degree of Freedom Force Output Joystick," Dept. of Mechanical Engineering, MIT May 1990, 131 pages.

(Continued)

*Primary Examiner*—Sumati Lefkowitz
*Assistant Examiner*—Seokyun Moon
(74) *Attorney, Agent, or Firm*—Thelen LLP; David B. Ritchie

(57) ABSTRACT

Controlling haptic sensations from a vibrotactile feedback device connected to a computer. The vibrotactile device includes an actuator having a rotatable mass, and receives information, which causes a periodic control signal to be produced. The control signal controls the actuator to rotate the mass to induce a vibration in the device, where a magnitude and a frequency of the vibration can be adjusted independently of each other by adjusting the control signal. Vibration magnitude is based on control signal duty cycle, and vibration frequency is based on control signal frequency. Kinesthetic haptic effects can be output on the vibrotactile device by mapping the kinesthetic effect to a vibrotactile effect that causes vibrotactile forces to be output. The kinesthetic haptic effect can be a periodic or nonperiodic effect.

13 Claims, 6 Drawing Sheets

U.S. PATENT DOCUMENTS

| | | | |
|---|---|---|---|
| 4,160,508 A | 7/1979 | Salisbury, Jr. | |
| 4,236,325 A | 12/1980 | Hall et al. | |
| 4,262,240 A | 4/1981 | Arai | |
| 4,334,280 A | 6/1982 | McDonald | |
| 4,355,348 A | 10/1982 | Williams | |
| 4,382,217 A | 5/1983 | Horner et al. | |
| 4,422,060 A | 12/1983 | Matsumoto et al. | |
| 4,513,235 A | 4/1985 | Acklam et al. | |
| 4,581,491 A | 4/1986 | Boothroyd | |
| 4,599,070 A | 7/1986 | Hladky et al. | |
| 4,708,656 A | 11/1987 | de Vries et al. | |
| 4,713,007 A | 12/1987 | Alban | |
| 4,794,392 A | 12/1988 | Selinko | |
| 4,811,921 A | 3/1989 | Whitaker et al. | |
| 4,868,549 A | 9/1989 | Affinito et al. | |
| 4,885,565 A | 12/1989 | Embach | |
| 4,891,764 A | 1/1990 | McIntosh | |
| 4,930,770 A | 6/1990 | Baker | |
| 4,934,694 A | 6/1990 | McIntosh | |
| 5,019,761 A | 5/1991 | Kraft | |
| 5,022,384 A | 6/1991 | Freels | |
| 5,022,407 A | 6/1991 | Horch et al. | |
| 5,035,242 A | 7/1991 | Franklin et al. | |
| 5,038,089 A | 8/1991 | Szakaly | |
| 5,078,152 A | 1/1992 | Bond et al. | |
| 5,103,404 A | 4/1992 | McIntosh | |
| 5,107,262 A | 4/1992 | Cadoz et al. | |
| 5,146,566 A | 9/1992 | Hollis, Jr. et al. | |
| 5,165,897 A | 11/1992 | Johnson | |
| 5,172,092 A | 12/1992 | Nguyen et al. | |
| 5,175,459 A | 12/1992 | Danial et al. | |
| 5,184,310 A | 2/1993 | Takenouchi | |
| 5,184,319 A | 2/1993 | Kramer | |
| 5,186,629 A | 2/1993 | Rohen | |
| 5,186,695 A | 2/1993 | Mangseth et al. | |
| 5,194,786 A | 3/1993 | Smith et al. | |
| 5,203,563 A | 4/1993 | Loper, III | |
| 5,212,473 A | 5/1993 | Louis | |
| 5,240,417 A | 8/1993 | Smithson et al. | |
| 5,271,290 A | 12/1993 | Fischer | |
| 5,275,174 A | 1/1994 | Cook | |
| 5,283,970 A | 2/1994 | Aigner | |
| 5,296,871 A | 3/1994 | Paley | |
| 5,299,810 A | 4/1994 | Pierce et al. | |
| 5,309,140 A | 5/1994 | Everett, Jr. et al. | |
| 5,334,027 A | 8/1994 | Wherlock | |
| 5,334,893 A | 8/1994 | Oudet et al. | |
| 5,354,162 A | 10/1994 | Burdea et al. | |
| 5,388,992 A | 2/1995 | Franklin et al. | |
| 5,389,849 A | 2/1995 | Asano et al. | |
| 5,399,091 A | 3/1995 | Mitsumoto | |
| 5,405,152 A | 4/1995 | Katanics et al. | |
| 5,435,729 A | 7/1995 | Hildreth et al. | |
| 5,436,622 A | 7/1995 | Gutman et al. | |
| 5,437,607 A | 8/1995 | Taylor | |
| 5,437,608 A | 8/1995 | Cutler | |
| 5,440,183 A | 8/1995 | Denne | |
| 5,456,341 A | 10/1995 | Garnjost et al. | |
| 5,466,213 A | 11/1995 | Hogan et al. | |
| 5,492,312 A | 2/1996 | Carlson | |
| 5,547,382 A | 8/1996 | Yamasaki et al. | |
| 5,554,900 A | 9/1996 | Pop, Sr. | |
| 5,565,840 A | 10/1996 | Thorner et al. | |
| 5,575,761 A | 11/1996 | Hajianpour | |
| 5,580,251 A | 12/1996 | Gilkes et al. | |
| 5,583,478 A | 12/1996 | Renzi | |
| 5,587,937 A | 12/1996 | Massie et al. | |
| 5,589,828 A | 12/1996 | Armstrong | |
| 5,619,180 A | 4/1997 | Massimino et al. | |
| 5,629,594 A | 5/1997 | Jacobus et al. | |
| 5,631,861 A | 5/1997 | Kramer | |
| 5,643,087 A | 7/1997 | Marcus et al. | |
| 5,649,020 A | 7/1997 | McClurg et al. | |
| 5,650,704 A | 7/1997 | Pratt et al. | |
| 5,661,446 A | 8/1997 | Anderson et al. | |
| 5,668,423 A * | 9/1997 | You et al. | 310/81 |
| 5,669,818 A | 9/1997 | Thorner et al. | |
| 5,684,722 A | 11/1997 | Thorner et al. | |
| 5,690,582 A | 11/1997 | Ulrich et al. | |
| 5,691,898 A | 11/1997 | Rosenberg et al. | |
| 5,694,013 A | 12/1997 | Stewart et al. | |
| 5,709,219 A | 1/1998 | Chen et al. | |
| 5,714,978 A | 2/1998 | Yamanaka et al. | |
| 5,731,804 A | 3/1998 | Rosenberg | |
| 5,734,236 A | 3/1998 | Motegi | |
| 5,734,373 A | 3/1998 | Rosenberg et al. | |
| 5,736,978 A | 4/1998 | Hasser et al. | |
| 5,739,811 A * | 4/1998 | Rosenberg et al. | 345/161 |
| 5,742,278 A | 4/1998 | Chen et al. | |
| 5,754,023 A | 5/1998 | Roston et al. | |
| 5,766,016 A | 6/1998 | Sinclair et al. | |
| 5,781,172 A | 7/1998 | Engel et al. | |
| 5,784,052 A | 7/1998 | Keyson | |
| 5,785,630 A | 7/1998 | Bobick et al. | |
| 5,790,108 A | 8/1998 | Salcudean et al. | |
| 5,805,140 A | 9/1998 | Rosenberg et al. | |
| 5,857,986 A | 1/1999 | Moriyasu | |
| 5,889,672 A | 3/1999 | Schuler et al. | |
| 5,894,263 A | 4/1999 | Shimakawa et al. | |
| 5,897,437 A | 4/1999 | Nishiumi et al. | |
| 5,907,212 A | 5/1999 | Okada | |
| 5,914,705 A | 6/1999 | Johnson et al. | |
| 5,945,772 A | 8/1999 | Macnak et al. | |
| 5,952,806 A | 9/1999 | Muramatsu | |
| 5,973,670 A | 10/1999 | Barber et al. | |
| 5,977,867 A | 11/1999 | Blouin | |
| 5,984,880 A | 11/1999 | Lander et al. | |
| 5,986,643 A | 11/1999 | Harvill et al. | |
| 6,001,014 A | 12/1999 | Ogata et al. | |
| 6,004,134 A | 12/1999 | Marcus et al. | |
| 6,022,274 A * | 2/2000 | Takeda et al. | 463/44 |
| 6,044,646 A | 4/2000 | Silverbrook | |
| 6,057,753 A | 5/2000 | Myers | |
| 6,078,126 A | 6/2000 | Rollins et al. | |
| 6,088,017 A | 7/2000 | Tremblay et al. | |
| 6,088,019 A | 7/2000 | Rosenberg | |
| 6,104,158 A | 8/2000 | Jacobus et al. | |
| 6,111,577 A | 8/2000 | Zilles et al. | |
| 6,160,489 A | 12/2000 | Perry et al. | |
| 6,171,191 B1 * | 1/2001 | Ogata et al. | 463/38 |
| 6,184,868 B1 | 2/2001 | Shahoian et al. | |
| 6,198,206 B1 | 3/2001 | Saarmaa et al. | |
| 6,211,861 B1 | 4/2001 | Rosenberg et al. | |
| 6,216,059 B1 | 4/2001 | Ierymenko | |
| 6,246,390 B1 | 6/2001 | Rosenberg | |
| 6,256,011 B1 | 7/2001 | Culver | |
| 6,268,671 B1 * | 7/2001 | Furuki | 310/81 |
| 6,275,213 B1 | 8/2001 | Tremblay et al. | |
| 6,317,032 B1 | 11/2001 | Oishi | |
| 6,373,463 B1 | 4/2002 | Beeks | |
| 6,422,941 B1 | 7/2002 | Thorner et al. | |
| 6,424,333 B1 | 7/2002 | Tremblay et al. | |
| 6,424,356 B2 | 7/2002 | Chang et al. | |
| 6,437,771 B1 | 8/2002 | Rosenberg et al. | |
| 6,448,977 B1 | 9/2002 | Braun et al. | |
| 6,585,595 B1 | 7/2003 | Soma et al. | |
| 6,636,197 B1 | 10/2003 | Goldenberg et al. | |
| 6,680,729 B1 | 1/2004 | Shahoian et al. | |
| 6,686,901 B2 | 2/2004 | Rosenberg | |
| 6,693,622 B1 | 2/2004 | Shahoian et al. | |
| 6,697,043 B1 | 2/2004 | Shahoian et al. | |
| 6,704,001 B1 | 3/2004 | Schena et al. | |
| 6,707,443 B2 | 3/2004 | Bruneau et al. | |
| 6,717,573 B1 | 4/2004 | Shahoian et al. | |

| | | | |
|---|---|---|---|
| 7,061,467 | B2 | 6/2006 | Rosenberg |
| 2002/0030663 | A1 | 3/2002 | Tierling et al. |
| 2003/0201975 | A1 | 10/2003 | Bailey et al. |

FOREIGN PATENT DOCUMENTS

| | | | |
|---|---|---|---|
| EP | 0 349 086 A1 | | 1/1990 |
| EP | 0626634 A2 | | 5/1994 |
| EP | 0607580 A1 | | 7/1994 |
| JP | H2-185278 | | 7/1990 |
| JP | H4-8381 | | 1/1992 |
| JP | H5-192449 | | 8/1993 |
| JP | H7-24147 | | 1/1995 |
| WO | WO 92/00559 | | 1/1992 |
| WO | WO 97/31333 | * | 8/1997 |
| WO | WO 98/32112 | | 7/1998 |
| WO | WO 99/40504 | | 12/1999 |
| WO | WO 01/03105 | | 1/2001 |
| WO | WO 01/13354 | | 2/2001 |
| WO | WO 01/24158 | | 4/2001 |
| WO | WO 02/27705 | | 4/2002 |

OTHER PUBLICATIONS

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance In Telepresence Tasks," *Ph.D. Dissertation*, Stanford University, Jun. 1994.

Schmult, Brian et al., "Application Areas for a Force-Feedback Joystick," ASME 1993, DSC-vol. 49, pp. 47-54.

Hasser, Christopher John, "Tactile Feedback for a Force-Reflecting Haptic Display," The School of Engineering, University of Dayton, Dec. 1995, pp. iii-xii & 1-96.

Akamatsu, M. et al., "Multimodal Mouse: A Mouse-Type Device with Tactile and Force Display," Presence, vol. 3, No. 1, 1994, pp. 73-80.

Kelley, A. J. et al., "MagicMouse: Tactile and Kinesthetic Feedback in the Human-Computer Interface using an Electromagnetically Actuated Input/Output Device," Dept. of Elec. Eng., Univ. of Brit. Columbia, 1993, pp. 1-27.

Hasser, C. et al., "Tactile Feedback with Adaptive Controller for a Force-Reflecting Haptic Display," Parts 1&2, IEEE 0-7803-3131-1, 1996, pp. 526-533.

Ramstein, C., "Combining Haptic and Braille Technologies: Design Issues and Pilot Study," Assets '96, 2nd Annual ACM Conf. on Assistive Technologies, 1996, pp. 37-44.

Dennerlein, et al., "Vibrotactile Feedback for Industrial Telemanipulators," ASME IMECE, 6th Annual Symp. On Haptic Interfaces for Virtual Environment and Teleoperator Systems, Nov. 1997, pp. 1-7.

Minsky, Margaret et al., "Feeling and Seeing: Issues in Force Display," ACM 089791-351-5, 1990, pp. 235-242.

Ouh-Young, M. et al., "Creating an Illustion of Feel: Control Issues in Force Display," Computer Science Dept. University of North Carolina, 1989, pp. 1-14.

Hasser, C., "Force-Reflecting Anthropormorphic Hand Masters," AL/CF-TR-1996-0110, 1995, pp. 5-31.

Kim, Won, "Telemanipulator Technology and Space Telerobotics," SPIE Proceedings, 1993, vol. 2057, pp. 40-50.

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. 1-84, Mar. 1, 1985.

Jones et al., " A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback in A Computer Mouse," *Proceedings of Fourteenth Annual Northeast Bioengineering Conference*, University of New Hampshire, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," Presence, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

\* cited by examiner

CONTROLLING HAPTIC SENSATIONS FOR VIBROTACTILE FEEDBACK INTERFACE DEVICES

CROSS REFERENCE TO RELATED APPLICATIONS

This application claims the benefit of and is a continuation of patent application Ser. No. 09/669,029, filed Sep. 25, 2000, now abandoned which is incorporated herein by reference for all purposes. In addition, this application claims the benefit of Provisional Patent Application No. 60/156,354, filed Sep. 28, 1999 by Goldenberg et al., entitled, "Controlling Force Sensations for Vibrotactile Feedback Interface Devices," and which is incorporated herein by reference for all purposes.

BACKGROUND

The present invention relates generally to control techniques for human-computer interface devices, and more specifically to controlling vibrotactile haptic sensations from a vibrotactile feedback device.

SUMMARY OF THE INVENTION

The present invention is directed to mapping kinesthetic force sensations to vibrotactile sensations output by a vibrotactile feedback device connected to a computer. Sophisticated vibrations can be output from a haptic feedback device that includes driver electronics driving a rotating mass in one direction, and allowing the magnitude and frequency of the resulting vibrations to be controlled independently. Other kinesthetic force effects can be mapped to other vibrations and motor control methods.

More specifically, one aspect of the present invention relates to a method for controlling a vibrotactile interface device, such as a gamepad, mouse, etc., from a host microprocessor. A desired haptic effect to be output by the vibrotactile interface device to a user is determined, and effect information is provided to the vibrotactile device, the information describing a magnitude and a frequency that are independent of each other. A periodic control signal based on the effect information drives a rotary motor of the vibrotactile device to cause a mass to rotate, where the rotation of the mass causes a vibration having the magnitude and frequency to be output to the user. The magnitude of the vibration is based on a duty cycle of the control signal, and the frequency of the vibration is based on a frequency of the control signal. In one embodiment, the control signal can be either on or off, where the control signal is turned on for an on-time for each period of the vibration, which determines the magnitude of the vibration. The provided information can include a higher level command and at least one parameter that is parsed by the device, or the information can be substantially equivalent to the control signal. The control signal may drive the motor in only one direction.

In another aspect of the present invention, a method for providing a vibration for a haptic feedback device coupled to a host microprocessor includes providing an actuator for the haptic feedback device, the actuator including a rotatable mass, and receiving information at the haptic feedback device which causes a control signal to be produced. The control signal controls the actuator to rotate the mass about an axis of rotation such that the mass rotation induces a vibration in the device, where a magnitude and a frequency of the vibration can be adjusted independently of each other by adjusting the control signal. A magnitude of the vibration is based on a duty cycle of the control signal and a frequency of the vibration is based on a frequency of the control signal. The control signal can be applied at a predetermined point in time of every period of the vibration. An on-time of the control signal can be determined as a percentage of a period of the vibration, or as a predetermined amount of time for each period. Methods can be used to ensure the mass is rotating, such as sending an initial control signal to said actuator to start the mass rotating before the vibration is output. A haptic feedback device including similar features is also disclosed. Some embodiments can cause the mass to move bidirectionally.

In another aspect of the present invention, a method for allowing kinesthetic haptic effects to be output on a vibrotactile interface device includes receiving a command describing a kinesthetic haptic effect that is intended to cause forces to be output in at least one degree of freedom of a manipulandum of a kinesthetic haptic feedback device that is manipulated by a user. The kinesthetic haptic effect is mapped to a vibrotactile haptic effect that is intended to cause vibrotactile forces to be output to a user contacting the vibrotactile device. The vibrotactile haptic effect is provided to be output by the vibrotactile interface device. The kinesthetic haptic effect can be a periodic effect having a specified magnitude and frequency, where the mapped vibrotactile haptic effect is a vibration having an equivalent magnitude and frequency. The kinesthetic haptic effect can also be a nonperiodic effect, such as a spring, damper, obstruction, or vector force, and the mapped vibrotactile haptic effect can be a vibration having a magnitude based on a magnitude of the nonperiodic effect.

The present invention advantageously provides methods for outputting more sophisticated force effects on a vibrotactile interface device. A vibrotactile feedback device of the present invention can independently control and specify the magnitude and frequency of vibrations output by a eccentric rotating mass motor using duty cycle and frequency of a control signal and can use low-cost uni-directional amplifiers and control circuitry. Techniques for mapping kinesthetic force effects to vibrotactile effects allow software designed to control kinesthetic force feedback devices to control haptic effects for vibrotactile devices. Less-expensive vibrotactile devices thus are a viable alternative to a purchaser to experience compelling haptic feedback in a variety of existing computer applications.

These and other advantages of the present invention will become apparent to those skilled in the art upon a reading of the following specification of the invention and a study of the several figures of the drawing.

DETAILED DESCRIPTION

This application describes techniques for controlling a vibrotactile interface controller, such as a haptic feedback gamepad, using more sophisticated force effects, as well as techniques for enhancing the vibrotactile feedback output by such vibrotactile controllers. Herein, the term "vibrotactile device" or "vibrotactile feedback device" is intended to refer to any controller or interface device that outputs vibrations to the user of the device, and can include gamepads, handheld steering wheels, fishing-type controllers, joysticks, mice, trackballs, adult devices, grips, remote controls, handheld game devices, flat screens, styluses, etc. In contrast, the term "kinesthetic device" or similar term is intended to refer to devices that provide forces along the axes or degrees of freedom of motion of a manipulandum of the device.

Figure 4:
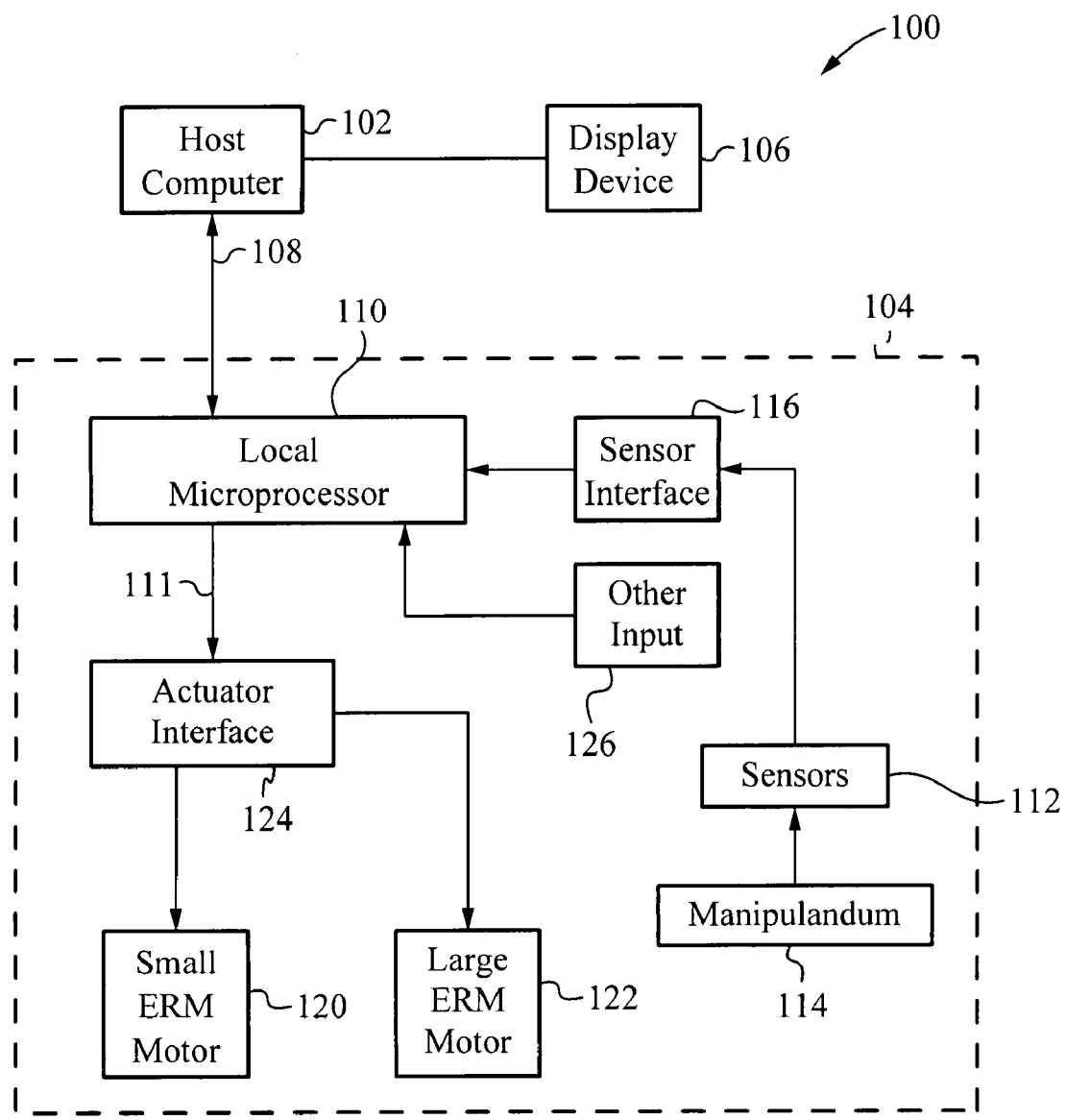
FIG. 4 is a block diagram of a vibrotactile interface device suitable for use with the present invention.
Figure 11:
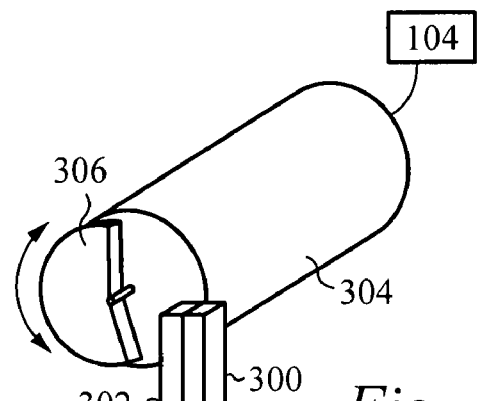
FIG. 11 is a diagram illustrating an actuator with a spring member and an obstacle member.

FIG. 4 is a block diagram illustrating a haptic system 100 suitable for use with the present invention. System 100 includes a host computer 102 and a vibrotactile device 104.

Host computer 102 is any of a variety of computing or electronic devices. In one preferred embodiment, computer 102 is a personal computer, game console, or workstation, such as a PC compatible computer or Macintosh personal computer, or game console system from Nintendo Corp., Sega Corp., Sony Corp., or Microsoft Corp. In other embodiments, host computer 102 can be a "set top box" which can be used, for example, to provide interactive television functions to users, or a "network-" or "internet-computer" which allows users to interact with a local or global network using standard connections and protocols such as used for the Internet and World Wide Web. Some embodiments may provide a host computer 102 within the same casing or housing as the interface device or manipulandum that is held or contacted by the user, e.g. hand-held video game units, portable computers, arcade game machines, etc. Host computer preferably includes a host microprocessor, random access memory (RAM), read only memory (ROM), input/output (I/O) circuitry, an audio output device, and other components of computers well-known to those skilled in the art. Other types of peripherals can also be coupled to host computer 102, such as storage devices (hard disk drive, CD ROM drive, floppy disk drive, etc.), printers, and other input and output devices.

A display device 106 is preferably connected or part of the computer 102 and displays images of a graphical environment, such as a game environment, operating system application, simulation, etc. Display device 106 can be any of a variety of types of devices, such as LCD displays, LED displays, CRT's, flat panel screens, display goggles, etc.

Host computer 102 preferably implements a host application program with which a user is interacting via the interface device 104 and other peripherals, if appropriate. For example, the host application program can be a video game, word processor or spreadsheet, Web page or browser that implements HTML or VRML instructions, scientific analysis program, virtual reality training program or application, or other application program that utilizes input of device 104 and outputs haptic feedback commands to the device 104 (or a different layer can output such commands, such as an API or driver program on the host). The host program checks for input signals received from the electronics and sensors of device 104, and outputs force values and/or commands to be converted into forces output for device 104. Suitable software drivers which interface such simulation software with computer input/output (I/O) devices are available from Immersion Corporation of San Jose, Calif.

Several different layers of programs can be running on the host computer 102. For example, at an application layer, one or more application programs can be running, such as a game program, word processing program, etc. Several sub-layers can also be provided, such as an Application Programming Interface (API) layer (e.g. used in Windows from Microsoft Corp.), and different driver layers. The application program can command forces directly, or a driver program can monitor interactions within an application program and command haptic effects when predetermined conditions are met. In one embodiment, a haptic feedback driver program can receive kinesthetic haptic commands from an application program and can map the commands to vibrotactile commands and effects, and then send the necessary information to the interface device 104.

Vibrotactile interface device 104 is coupled to host computer 102 by a bi-directional bus 108. The bidirectional bus sends signals in either direction between host computer 102 and the interface device. For example, bus 108 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to actuators of device 104.

Vibrotactile device 104 can, in many embodiments, include a local microprocessor 110. Local microprocessor 110 can optionally be included within the housing of device 104 to allow efficient communication with other components of the device. Processor 110 is considered local to device 104, where "local" herein refers to processor 110 being a separate microprocessor from any processors in host computer 102. "Local" also preferably refers to processor 110 being dedicated to haptic feedback and sensor I/O of device 104. Microprocessor 110 can be provided with software instructions to wait for commands or requests from host 102, decode or parse the command or request, and handle/control input and output signals according to the command or request. In some embodiments, processor 110 can operate independently of host computer 102 by reading sensor signals and calculating appropriate forces from those sensor signals, time signals, and stored or relayed instructions selected in accordance with a high level host command. Suitable microprocessors for use as local microprocessor 110 include the MC68HC711E9 by Motorola, the PIC16C74 by Microchip, and the 82930AX by Intel Corp., for example, as well as more sophisticated force feedback processors such as the Immersion Touchsense™ Processor, current versions of which are used with personal computers such as PC's. Microprocessor 110 can include one microprocessor chip, multiple processors and/or co-processor chips, and/or digital signal processor (DSP) capability. For example, the control techniques described for the present invention can be implemented within firmware of an Immersion TouchSense Processor, where the local microprocessor block 110 includes related components, such as encoder processing circuitry, communication circuitry, and PWM circuitry as well as a microprocessor. Various techniques for playing more sophisticated periodics and other sensations (such as defined by Immersion protocols) with a eccentric rotating mass (ERM) motor can be provided in the firmware of the microprocessor 110.

Microprocessor 110 can receive signals from sensors 112 and provide signals to actuators 120 and 122 in accordance with instructions provided by host computer 102 over bus 108. The microprocessor 110 provides a signal 111, which is defined as a "Control Signal" herein. In one embodiment, the Control Signal is a PWM signal the firmware of processor 110 can generate and send to the amplifier in actuator interface 124. There is preferably one Control Signal per motor, such that two control signals are provided in the described embodiment. Another term used herein is "on-time," which is the amount of time the Control Signal remains high once it goes high. The Control Signal provides the drive signal for the actuators, as described in greater detail below.

In one local control embodiment, host computer 102 provides high level supervisory commands to microprocessor 110 over bus 108, and microprocessor 110 decodes the commands and manages low level force control loops to sensors and the actuator in accordance with the high level commands and independently of the host computer 102. This operation is described in greater detail in U.S. Pat. Nos. 5,739,811 and 5,734,373, both incorporated by reference herein. In the host control loop, force commands are output from the host computer to microprocessor 110 and instruct the microprocessor to output a force or force sensation having specified characteristics. The local microprocessor 110 reports data to the host computer, such as locative data that describes the position of the mouse in one or more provided degrees of freedom. The data can also describe the states of buttons or other devices of device 104. The host computer uses the data to update executed programs. In the local control loop, actuator signals are provided from the microprocessor 110 to the actuators and sensor signals are provided from the sensors 112 and other input devices to the microprocessor 110. The microprocessor 110 can process inputted sensor signals to determine appropriate output actuator control signals by following stored instructions. The microprocessor may use sensor signals in the local determination of forces to be output, as well as reporting locative data derived from the sensor signals to the host computer.

In yet other embodiments, other hardware can be provided locally to device 104 to provide functionality similar to microprocessor 110. For example, a hardware state machine incorporating fixed logic can be used to provide signals to the actuators and receive sensor signals from sensors 112, and to output tactile signals according to a predefined sequence, algorithm, or process. Techniques for implementing logic with desired functions in hardware are well known to those skilled in the art. Such hardware can be well suited to less complex force feedback devices, such as the device of the present invention.

In a different, host-controlled embodiment, host computer 102 can provide low-level force commands over bus 108, which are directly transmitted to the actuator via microprocessor 110 or other circuitry (if no microprocessor 110 is present). Host computer 102 thus directly controls and processes all signals to and from the device 104, e.g. the host computer directly controls the forces output by actuator 120 or 122 and directly receives sensor signals from sensor 112 and input devices 126. This embodiment may be desirable to reduce the cost of the force feedback device yet further, since no complex local microprocessor 110 or other processing circuitry need be included in the device 104. The host 102 can also stream force values that are sent to the actuators, as described in U.S. Pat. No. 5,959,613, incorporated herein by reference.

In the simplest host control embodiment, the signal from the host to the device can be a single bit that indicates whether to pulse the actuator at a predefined frequency and magnitude. In more complex embodiments, the signal from the host can include a magnitude, giving the strength of the desired pulse, and/or a frequency. A local processor can also be used to receive a simple command from the host that indicates a desired force value to apply over time, so that the microprocessor outputs the force value for the specified time period based on the one command. The host command may also specify an "envelope" to provide on a force output to allow force shaping, as disclosed in U.S. Pat. No. 5,959,613. Furthermore, force values (magnitudes, etc.) can be streamed from the host computer to be output in real time by the device, as described in U.S. Pat. No. 5,959,613 and copending provisional application No. 60/160,401. A combination of numerous methods described above can also be used for a single device 104.

Local memory, such as RAM and/or ROM, can be coupled to microprocessor 110 in device 104 to store instructions for microprocessor 110 and store temporary and other data. For example, force profiles can be stored in memory, such as a sequence of stored force values that can be output by the microprocessor, or a look-up table of force values to be output based on current events in the application program or other conditions. In addition, a local clock can be coupled to the microprocessor 110 to provide timing data, which might be required, for example, to compute forces output by actuator (e.g., forces dependent on time dependent factors). In embodiments using the USB communication interface, timing data for microprocessor 110 can be alternatively retrieved from the USB signal.

Sensors 112 sense the position or motion of a manipulandum 114 of the device 104 and provides signals to microprocessor 110 (or host 102) including information representative of the position or motion. In some embodiments, the manipulandum is a small joystick provided on a gamepad controller and moved by a user in two rotary or linear degrees of freedom to provide control input to the host computer. In other embodiments, the manipulandum can be a direction pad having four or more directions which can provide input to the host computer. The manipulandum can also be a rotary dial, linear slider, wheel, finger receptacle, cylinder, or other controlling member. The manipulandum can also be the housing of the device itself, as in the case of a mouse or if sensing the position of a gamepad or other controller in 3-D space. Sensors suitable for detecting motion of a joystick or other manipulandum include digital optical encoders frictionally coupled to a rotating ball or cylinder, as is well known to those skilled in the art. Mechanical switches, linear optical encoders, potentiometers, optical sensors, velocity sensors, acceleration sensors, strain gauges, or other types of sensors can also be used, and either relative or absolute sensors can be provided. Optional sensor interface 116 can be used to convert sensor signals to signals that can be interpreted by the microprocessor 110 and/or host computer 102, as is well known to those skilled in the art.

Actuators 120 and 122 transmit forces to the user of the device 104 in response to signals or commands received from microprocessor 110 and/or host computer 102. In one described embodiment, two actuators are provided, a small actuator 120 and a larger actuator 122. In the preferred embodiment, these actuators are eccentric rotating mass (ERM) DC motors, which are rotary motors having an eccentric mass coupled to the rotating shaft of the motor. When rotated, the inertial forces from the rotating mass cause an oscillation or vibration in the housing or other member coupled to the motor housing, thus producing vibrotactile sensations to the user who is holding or otherwise contacting the housing. Actuators 120 and 122 thus provide "informative" or "effect" vibrotactile forces. The small motor 120 can provide high frequency, low magnitude forces, while the large motor 122 can provide lower frequency, higher magnitude forces.

Alternate embodiments can employ a single actuator, or two or more actuators of the same or differing sizes for providing vibrotactile sensations or forces to the user of the device 104. Many different types of actuators can be used, e.g. any type of actuator which can rotate an eccentric mass in a direction, such as voice coil actuators, moving magnet actuators, hydraulic or pneumatic actuators, torquers, brushed or brushless motors, etc. Furthermore, additional actuators can be included to provide kinesthetic force feedback in the manipulandum 114.

Actuator interface 124 can be optionally connected between actuators 120 and 122 and microprocessor 110 to convert signals from microprocessor 110 into signals appropriate to drive the actuators. Interface 124 can include power amplifiers, switches, digital to analog controllers (DACs), analog to digital controllers (ADCs), and other components, as is well known to those skilled in the art. For example, in one embodiment the actuators 120 and 122 are off-the-shelf ERM motors which are driven unidirectionally. Uni-directional voltage mode amplifiers are low cost components that can be used in actuator interface 124 to drive the motors.

Other input devices 118 are included in device 104 and send input signals to microprocessor 110 or to host 102 when manipulated by the user. Such input devices can include buttons, dials, switches, scroll wheels, or other controls or mechanisms. Power supply 120 can optionally be included in or coupled to device 104, and can be coupled to actuator interface 124 and/or actuators 120 and 122 to provide electrical power to the actuators. Alternatively, and more preferably, power can be drawn from the bus 108, e.g. using a USB or other bus. Also, received power can be stored and regulated by device 104 and thus used when needed to drive actuators 120 and 122 or used in a supplementary fashion. Because of the limited power supply capabilities of USB, a power storage device may be required in the mouse device to ensure that peak forces can be applied (as described in U.S. Pat. No. 5,929,607, incorporated herein by reference). For example, power can be stored over time in a capacitor or battery and then immediately dissipated to output a haptic sensation. Alternatively, this technology can be employed in a wireless device 104, in which case battery power can be used to drive the tactile actuator.

Figure 1:
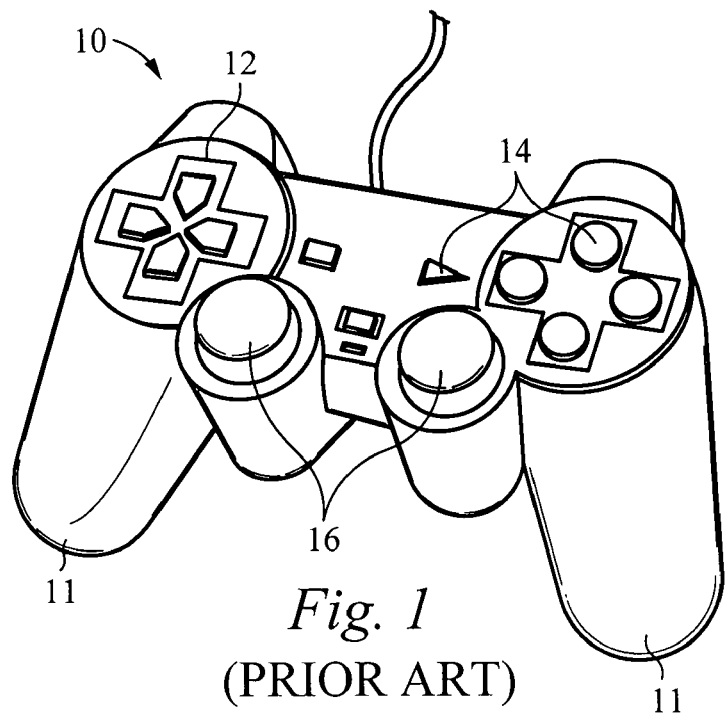
FIGS. 1 and 2 are perspective views of gamepad vibrotactile interface devices which can be used with the present invention.
Figure 2:
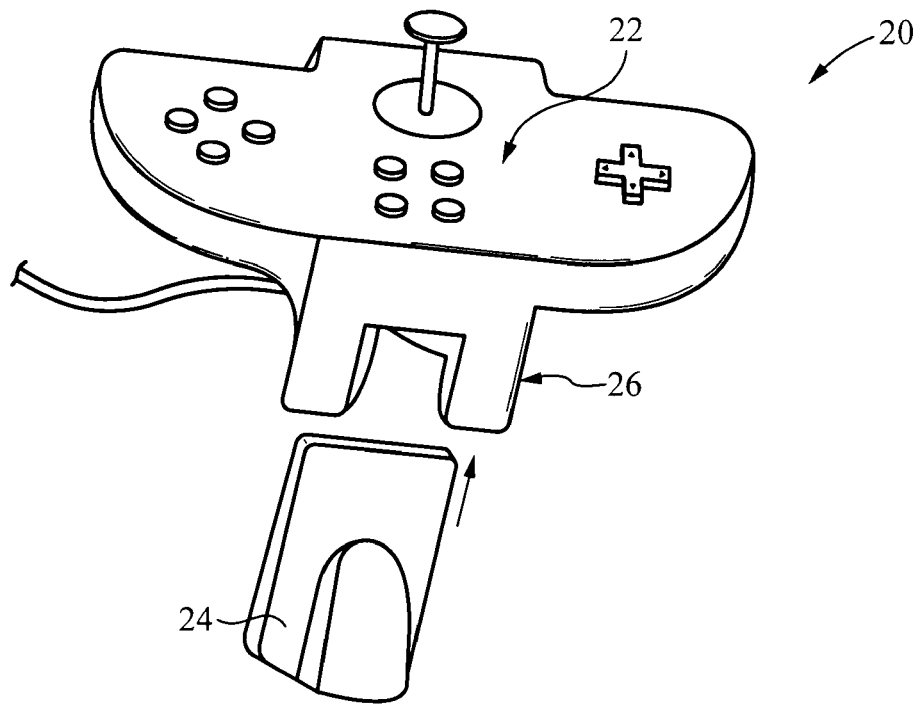
Figure 3:
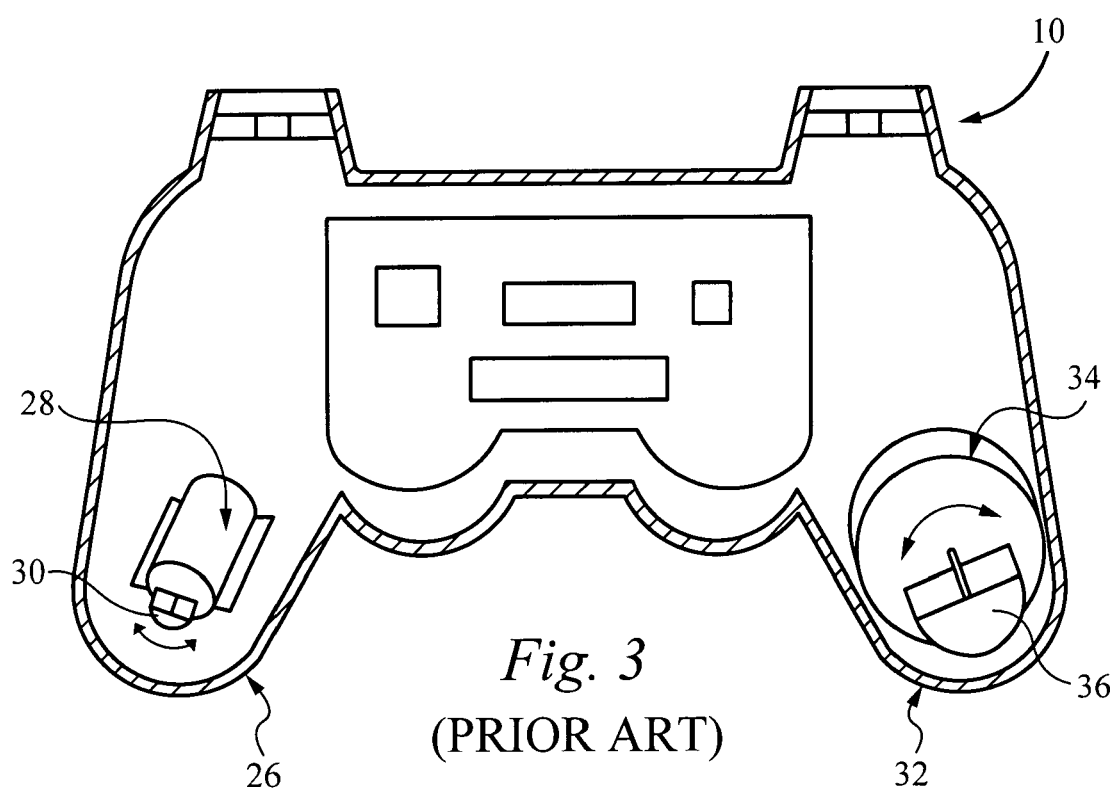
FIG. 3 is a top view of an interior of the gamepad device of FIG. 1.

For many of the various control features of the present invention described below, an existing console gamepad interface device, such as those shown in FIGS. 1-3, can be used as interface device 104. In other embodiments, an existing gamepad controller can be provided with a more sophisticated local microprocessor to allow more sophisticated haptic sensations to be controlled and output by the interface device. For example, a Sony Dual Shock-compatible product for the PlayStation console can be modified to use an Immersion Touchsense Processor-compatible microprocessor and retain the remaining existing motors and electronics. However, there are no components that the vibrotactile controller of the present invention need retain from a standard prior art console implementation; different components can be used as necessary or to provide a better haptic output. For example, the Dual Shock controller uses a special PlayStation bus and proprietary protocol, while a PC version can use Universal Serial Bus (USB) or a Serial protocol and be DirectX/Immersion compatible. DirectX from Microsoft Corporation prescribes a set of conditions and haptic effects for the Windows operating system provided on a PC. In other implementations, such as for Macintosh or other computers or systems, other standard protocols and interfaces for those platforms can be used. In yet other embodiments, a variety of other types of vibrotactile interface devices which output vibrations to the user can be used with the vibrotactile control features described herein, such as gamepads, handheld or surface-grounded steering wheels, fishing-type controllers, joysticks, mice, trackballs, adult devices, grips, remote controls, handheld game devices, flat screens, styluses, etc.

Drive Methods

The ERM motors described above are low cost and thus desirable for use in mass market haptic feedback devices. The ERM motors, however, can be driven in different ways to provide haptic sensations, as described below. In some embodiments, two or more of these drive methods can be employed in a single device, depending on the type of haptic sensations desired.

The preferred drive method is to drive the motors uni-directionally, since uni-directional amplifiers and other components are lower in cost than more sophisticated components. However, in a different bi-directional embodiment, a harmonic drive (bi-directional, like a speaker) may be applied to an ERM motor to produce exact frequencies with independently varying magnitude using a forcing function control signal. In the bi-directional embodiment, the eccentric mass of the motor is driven in pendulous motion in two directions and need not ever make a complete, full rotation. Such a drive has a substantially increased power demand and usually requires more expensive driver circuitry than uni-directional embodiments, but may provide more precisely-controlled haptic sensations. Such a bidirectional embodiment is described in greater detail in copending application Ser. No. 09/608,125, filed Jun. 39, 2000, entitled, "Controlling Vibrotactile Sensations for Haptic Feedback Devices," and incorporated herein by reference.

However, as described herein, there are other ways to provide haptic sensations similar to those produced by a harmonic drive but without the added cost and power demand. The first method is to use a uni-directional amplifier to drive the ERM in circular motion, and to pulse the mass instead of changing its direction in order to play the frequency content of a vibration. The second method is to use a uni-directional amplifier to drive the ERM in pendulous (bidirectional) motion, but relying on gravity to move the mass in the opposite direction and provide the return torque instead of the amplifier, since the motor is only driven in one direction (although the motor can be slowed by commanding a voltage less than the back EMF of the motor, as is well known to those skilled in the art). Both of these drive schemes are utilized by the control method described below, where pendulous motion is exhibited when the commanded magnitude is sufficiently low to be unable to drive a full mass revolution. For example, the parameters that are passed to the local microprocessor 110 (or other controller) can determine whether the ERM spins or follows a pendulous motion.

A third drive method employs an interfering member, such as a stop 300 and/or a spring 302, to ensure oscillatory motion of the rotating mass 306. A stop 300 can be placed in the path of the ERM 306 which prevents the ERM from making a complete rotation, and which can transmit vibrations to the housing of the device from the impact of the ERM with the stop 300. A spring material 302 can also or alternatively be used, where the spring can be placed between the stop 300 and the ERM 306. When the ERM 306 hits the spring 302 (such as foam, rubber, coiled spring, flexure, or other resilient or compliant material), the spring's resilience causes the ERM 306 to move back with greater force than without the spring 302. The actuator force can be dynamically adjusted to provide desired vibration magnitude and simultaneously overcome spring force. The spring 302 adds energy back into the system once the actuator force is removed. The result is that a low-cost uni-directional amplifier is able to actively spin the mass in both directions.

Mapping Vibrotactile Effects to Kinesthetic Force Effects

A central issue addressed by the present invention is how to translate existing kinesthetic haptic effects to vibrotactile haptic effects. Many existing types of kinesthetic effects exist in current devices. For example, Immersion Studio™ from Immersion Corp. is a software tool that allows a developer to design a wide variety of haptic sensations, many of which are kinesthetic effects such as spring forces, damping forces, and obstruction forces. A problem exists when a vibrotactile device is used with an application program or other software that was meant to be used for a kinesthetic haptic device such as a steering wheel, force feedback joystick (such as the Wingman Force Feedback Joystick from Logitech, Inc.), or kinesthetic force feedback mouse (such as the Wingman Force Feedback Mouse from Logitech, Inc.). Many types of kinesthetic haptic effects, such as springs, dampers, and obstructions, may have no meaning in a vibrotactile device if output without modification, since most vibrotactile devices do not output forces to resist or assist motion of a manipulandum of the device.

The present invention allows kinesthetic effects to be output by vibrotactile devices by providing mappings, where a particular vibrotactile effect is designated to be the "equivalent" of a particular kinesthetic force effect. Some kinesthetic effects can be mapped almost directly to vibrotactile effects, such as vibrations. Other kinesthetic effects must be approximated in ways greatly differing from the original effect due to the inability of the vibrotactile device to output directional forces on the motion of a manipulandum. For example, a particular collision effect in DirectX can be implemented as a vector force provided in a particular direction of movement of the user manipulatable object. A particular vibrotactile device, however, may not be able to output forces in a particular direction, so that the vector force must be approximated with a different vibrotactile sensation.

Mappings between vibrotactile effects and kinesthetic effects can be made in general terms or more specific terms. For example, a particular vibrotactile effect can be designated to be a replacement for vector kinesthetic effects in all applications and circumstances in which that kinesthetic effect would have been output on a kinesthetic device. Alternatively, different vibrotactile effects can be mapped to a particular kinesthetic effect based on the particular context or application in which the kinesthetic effect is used. For example, a first vibrotactile effect might be used to approximate a kinesthetic vector force in a racing game, while a second, different vibrotactile effect can be used to approximate that kinesthetic vector force in a fighting game or a flight simulator game. In many cases, such a scheme involving specific applications can provide more realistic results since the vibrotactile effects are tailored for the most realism in a particular application.

Kinesthetic force effects can be organized into periodic and non-periodic effects. Periodic effects such as vibrations are discussed first since these effects can be most easily translated from kinesthetic to vibrotactile domains, while other, non-periodic effect mappings are described at a later point. Both periodic and non-periodic kinesthetic force feedback effects are more fully described in U.S. Pat. No. 5,734,373 and copending patent application Ser. No. 08/846,011, both incorporated herein by reference.

In one embodiment, when an application program is run on the host computer, the program detects what type of controller device is being used with the application program, and selects an appropriate set of effects for that device. If a vibrotactile device is used, the mappings for vibrotactile effects are used; if a kinesthetic device is used, then standard kinesthetic effects can be output. Alternatively, the application (e.g. game) program can be completely ignorant of the type of device connected (or can know the type of device but can be ignorant of mappings described herein), so that the mappings are handled by a lower-level driver running on the host computer and/or by the local microprocessor/firmware on the device. For example, a vibrotactile-specific driver running on the host can evaluate outgoing commands and map them to vibrotactile commands, if appropriate, so that the device need perform no mapping tasks. Alternatively (or in addition), the local microprocessor can include a look-up table or other data to map certain kinesthetic force effects to vibrotactile effects and control the motors appropriately.

One or more mappings of vibrotactile forces to kinesthetic forces can (in any embodiment) also be selectively applied based on the application or circumstances in which the force effect is commanded. For example, if a kinesthetic vector force has been output for a collision occurring in a game, the equivalent vibration forces may be appropriate. But if the vector force is being used to simulate a dynamic spring return on the steering wheel during a turn, then the vibration force may not be appropriate and is not commanded to be output.

To determine the application or circumstances for which a particular kinesthetic force is being used, different methods can be employed. For example, in one embodiment, the command protocol can include one or more parameters indicating the purpose for the command, such as "collision," "turn," or "spin out." A specialized vibrotactile driver on the host (or the local microprocessor) can examine the purpose parameter to determine whether to output a force based on stored instructions governing such output. However, since such an embodiment would require a change to existing protocols, other methods are preferred.

In one embodiment, for example, a set of force effects which are intended to be used with vibrotactile devices can be available to developers when programming haptic effects and available to be installed by users on a computer so that mappings are available to a driver. Each vibrotactile set of haptic effects can be intended for a particular broad category of applications, such as driving games, flight simulation, fighting games, a word processor, Internet browser, DVD interface, etc. Alternatively, a set of mappings can be specific to one particular application program, such as a particular game. When a user wishes to include haptic feedback effects for one of these applications, the user obtains the set of effects for the application and loads the set to the operating system or otherwise makes the set available to the vibrotactile driver (or local microprocessor). Or, the application program itself can perform the mappings, and thus the set would be available to the application program. Thus, a set of effects for all automobile driving games (or a particular driving game) would map vibrotactile effects to particular kinesthetic forces, which are appropriate and effective for driving circumstances in these games. These sets of pre-mapped vibrotactile effects can be available from a central provider or developer, e.g. downloaded from a website or provided with an application program.

Furthermore, a set of mappings may also include settings for overall magnitudes provided in a "control panel." For example, a control panel driver can be available on the host computer to allow the user to adjust the overall magnitudes of particular force sensations (or an overall gain of all force sensations) to a desired level. A set of mappings for vibrotactile effects can also include settings for these control panel force sensations to maximize the effectiveness of the vibrotactile effects for that type of application program. For example, the mappings for a driving game might also set spring forces to a lower overall magnitude and increase vibrations to a greater overall magnitude.

Some embodiments can allow the device (or a haptic driver) to ignore all kinesthetic effects that do not directly translate to the vibrotactile domain when a vibrotactile device is being used. Thus, all spring, damper, attraction, and obstruction forces can be ignored, allowing mainly jolts and vibrations to be only output. However, since some types of kinesthetic forces, such as some obstructions, can be effectively simulated or approximated using vibrations, the types of kinesthetic forces that are ignored can vary depending on the embodiment or application.

Embodiment Constraints

In providing control techniques to best portray DirectX/Immersion kinesthetic effects in a vibrotactile gamepad device, some particular considerations can make the vibrotactile device simple with a low production cost, for those embodiments with such cost constraints. For example, a stock eccentric mass motor can be used to take advantage of existing supplies of these motors. The motor drivers should be assumed to operate uni-directionally, since that is the most common type of motor operation in current vibrotactile devices. In addition, uni-directional voltage-mode amplifiers are significantly cheaper than sophisticated current-mode amplifiers used in kinesthetic devices, and they can be built with a single transistor. Since torque control is not crucial to most embodiments, a current-mode amplifier need not be used. Furthermore, sensors for detecting the position of the rotating mass are expensive and can be omitted for cost reasons, as in prior art gamepad vibrotactile controllers. Such a sensor can be added in some embodiments if necessary. The product can use the Immersion Touchsense Processor from Immersion Corp. or similar microprocessor. No power limitations are preferably imposed on actuator output, and power from the communication bus is preferably sufficient for device operation (e.g. using a USB bus).

It is preferable in many embodiments of the interface device that the device have minimal power requirements so as to avoid the use of bulky power supplies and/or to preserve the life of limited power sources such as batteries. For example, where appropriate, gamepad vibrotactile devices can meet the Universal Serial Bus (USB) power specification of maximum 0.5 A at 5 volts, thereby allowing all power to be received over the USB. Other measures can be taken as well. For example, in devices having two motors, each motor's power requirements can be quantified. In some embodiments, it may be necessary to remove one of the two motors from the system entirely to meet power requirements. If the motors are of different sizes, then the small motor can be removed and the large motor can be used to reach about 35 Hz with independent magnitude and frequency control. Beyond 35 Hz, frequency changes may become imperceptible. If the large motor is removed, the small motor can provide fuller bandwidth but may not be able to meet magnitude requirements within that bandwidth.

If enough power is available for two or more motors in such a device, there are additional steps that can be taken to reduce peak power. In the described methods above, both motors can be turned on simultaneously when each period begins. However, if one motor's phase is offset so that the it does not get pulsed until the other motor's on-time has completed, then the two motors are prevented from operating simultaneously, and peak power may be reduced. It should be noted that the phases of the two motors should not be offset by 180 degrees, or the resulting vibration may feel to the user as if it is double the intended frequency. Preferably, one motor is offset by the maximum "on-time per period" of the other motor (see below). Later, a dynamic algorithm (e.g., running on the local microprocessor) can monitor power and only turn both motors on if the first motor allows enough power headroom. A final scheme to reduce power reduces the magnitude of the control signal in favor of increasing the on-time of the control signal. This should deliver the same amount of energy to the motor, though this technique may undesirably lessen the magnitude and impact of the vibrations.

Controlling Periodic Effects

Periodic effects are those force feedback effects, which are based on time and controlled with a periodic waveform. For example, a vibration is a basic periodic effect in which a waveform type, such as a sine wave or square wave, is commanded to output the vibration at a particular frequency (period) and magnitude. The effect does not require other data such as velocity or position of a user manipulandum or a direction of output. Single, non-directional jolts can be output as a single period of a vibration or part of a period of a vibration.

When considering periodic effects, the problem becomes how frequency and magnitude of a periodic effect can be varied independently and displayed on a single degree of freedom actuator, such as (but not restricted to) an ERM motor.

Many standard gamepad vibrotactile devices rotate ERMs at a fixed magnitude and frequency, the two of which are tightly coupled. For example, high frequency vibrations are necessarily high magnitude, while low frequency vibrations are necessarily low frequency. The present inventive method of control allows independent variation of magnitude and frequency of a 1 degree-of-freedom (DOF), unidirectionally-driven rotary actuator. The technique is significant because it enables an ERM to create complex vibrations, like decaying sinusoids or superimposed waveforms. An ERM in prior devices had a magnitude that was roughly linearly coupled to its speed. The present invention, utilizing no extra clutches, circuitry, or mechanical parts and using only these control methods (e.g. implemented in firmware of microprocessor 110 or other controller), can play a range of frequencies at any amplitude using an ERM motor. Note that the control methods described herein can be applied not only to rotational motors but other types of 1 DOF actuators, rotational and linear, including moving magnet motors, solenoids, voice coil actuators, etc.

In this inventive method of control, a frequency command, a magnitude command, and a function (i.e. sine wave, square wave, triangle wave) are supplied as parameters or inputs to the firmware. This follows the existing Immersion/DirectX protocol used in PC's, in which a vibration is controlled with magnitude, frequency, and function type parameters (and additional parameters, if desired). Therefore, a direct mapping between kinesthetic and vibrotactile devices is possible with the present invention, i.e., no mapping may be needed, where the existing periodic effect can be commanded directly to the kinesthetic or vibrotactile device, unchanged.

Figure 5:
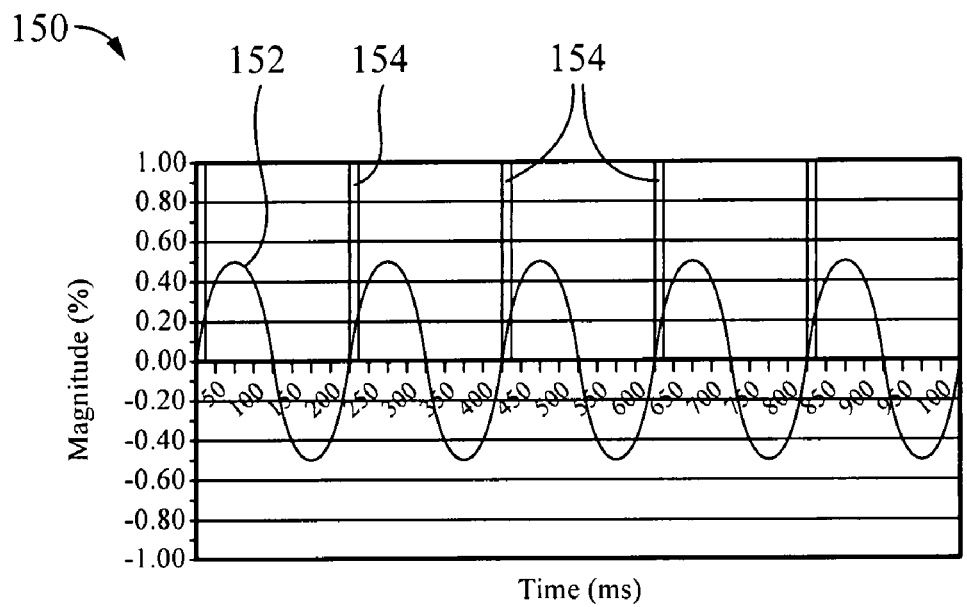
FIG. 5 is a graph illustrating a control signal of the present invention and resulting output vibration.

An example is illustrated in the graph 150 shown in FIG. 5, showing a time vs. magnitude relationship. A sine wave 152 of frequency 5 Hz and 50% magnitude is shown as the desired vibration to be output by the device (this, and all subsequent similar figures, capture 1 second of input and output signals). The present control method determines where each period of the waveform begins (or should begin), then raises a control signal 154 to a high or "on" level for a specific duration once per period; the control signal 154 is "off" or low during the other times. Thus, the periodic control signal has a frequency based on the desired (commanded) frequency. By pulsing the actuator once per period using control signal 154, the perception of a vibration with specified frequency is conveyed to the user. The control signal can be raised to a high level at the beginning of a period, as shown, or at a different time within the period.

Figure 6:
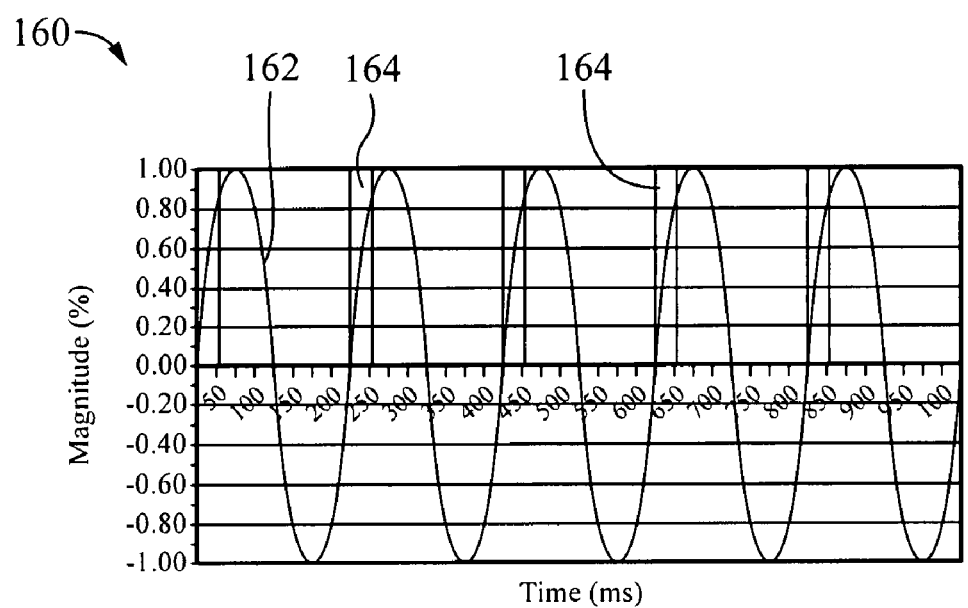
FIG. 6 is a graph illustrating a control signal of the present invention modified from FIG. 5 and resulting output vibration.

Magnitude of the periodic effect is portrayed by adjusting a duty cycle of the control signal, e.g. the duration at each period ("on-time per period") of the control signal 154. The control signal 154 is either on or off, but the amount of time per period for which the control signal remains on is determined by the magnitude command or parameter. In FIG. 5, a sine wave with 50% of the possible magnitude is requested. According to the present invention, this requested magnitude generates a control signal 154 that comes on every 250 ms for 15 ms duration. For comparison, a 100% magnitude waveform with the same frequency is offered in FIG. 6, which shows a similar graph 160 to graph 154. The control signal 164 comes on at the same interval as the control signal 154 described above, since the frequency command has not changed. However, the control signal 164 stays on twice as long to produce the feeling in the user of twice the magnitude of vibration. The longer that the control signal is on, the longer the actuator spends accelerating. In our case, the ERM reaches a larger angular velocity and, since force is proportional to the square of angular velocity, larger forces are perceived at the user's hand. Preferably, the mass is never allowed to stop rotating, so that static friction need be overcome only once, at the start of rotation. If the control signal remains on too long, the rotating mass will make multiple revolutions and eventually reach its natural (resonant) frequency. At that point, the user will perceive the natural frequency of the system and not the commanded frequency.

Thus, according to the present invention, 1) how often the control signal comes on depends directly on frequency command, and 2) how long the control signal remains on (control signal on-time) is related to the magnitude command. The determination of the on-time of the control signal can be accomplished in different ways. Two different ways are presented here. First, on-time can be regulated as a "percentage of period." If the control signal comes on for a fixed percentage of each period, as frequency increases, on-time per period decreases. Yet the control signal comes on more often. The end result is that the control signal spends the same amount of time on each second, no matter what the frequency. This technique offers the advantage that, as frequency increases, constant power is added to the actuator, and perceived magnitude stays the same over the frequency range. It should be noted that, if on-time is decreased sufficiently, the mass may not actually rotate in one direction, but may move bi-directionally due to the small driving time and gravity that causes the mass to move back in the opposite direction once the control signal is turned off. However, this does not adversely affect the output vibration sensed by the user, which is perceived at the desired frequency and magnitude regardless of whether the mass completes full rotations in one direction or is moving bi-directionally.

Figure 7:
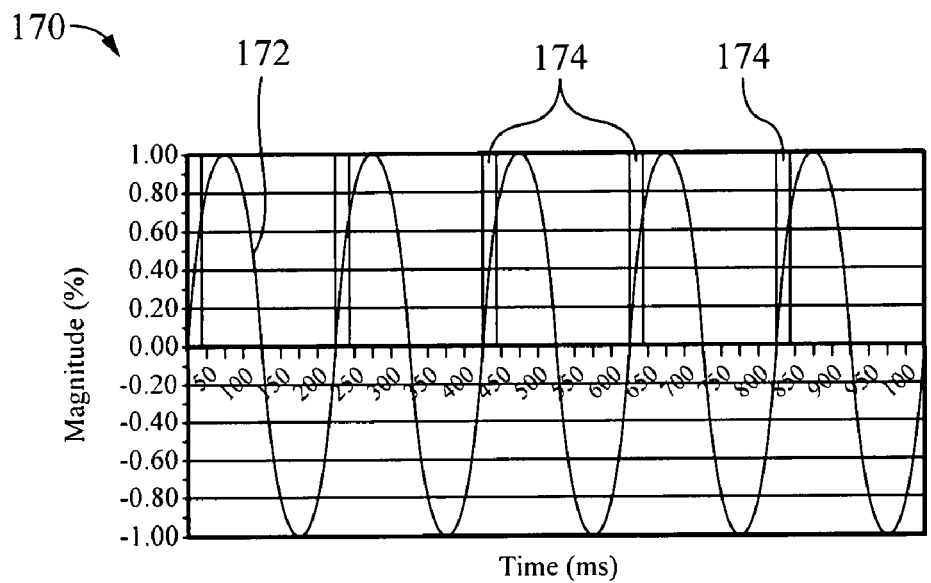
FIGS. 7, 8 and 9 are graphs illustrating control signals of different frequencies and the resulting vibrations.
Figure 8:
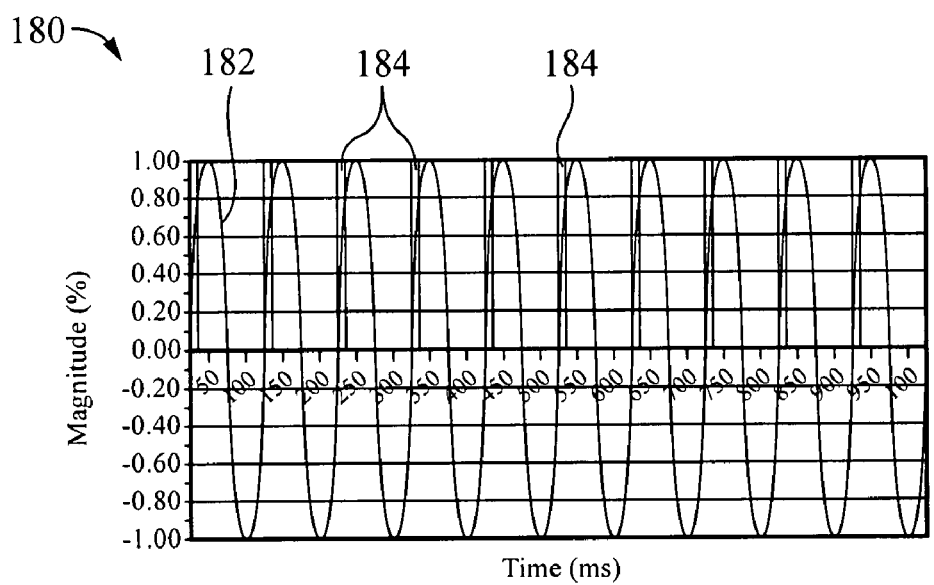

FIGS. 7 and 8 illustrate graphs 170 and 180, respectively, showing different control signals and the resulting sine wave for vibration. In FIG. 7, the frequency of the sine wave 172 is 5 Hz and the magnitude is 100%. In FIG. 8, the frequency of the sine wave 182 is 10 Hz and the magnitude is 100%. The control signal 174 of FIG. 7 is on for about 40 ms at each period, and the control signal 184 of FIG. 8 is on for about 20 ms at each period. Comparing the control signals of FIGS. 7 and 8, it is apparent that the total on-time per second remains constant between the two graphs while the frequency varies: as the frequency command doubles, the figures show how the on-time per period of the control signal is halved yet the on-time per second remains the same.

Figure 9:
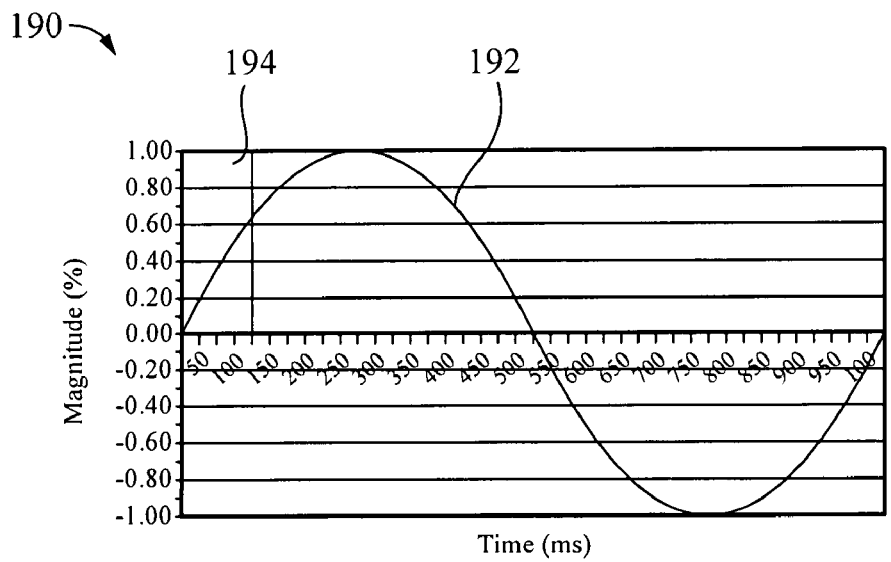

A problem with this "percentage of period" technique for commanding a desired vibration is that in many embodiments it may not work well at lower frequencies. At low frequencies (e.g., less than 2 Hz for the large ERM motor in the Sony Dual Shock gamepad), too much power is delivered to the actuator at once. For example, FIG. 9 is a graph 190 showing 1 second of a sine waveform 192 that produces a vibration of low frequency (1 Hz) and 100% magnitude; only one period is provided for the 1 second duration. The control signal 194 is set high at the beginning of the period, for 125 ms.

Both graphs 180 of FIG. 8 and 190 of FIG. 9 set the control signal high for the same total amount of time per second. However, in FIG. 9 all the power from a 1 second period is delivered in a continuous 125 ms at the beginning of the period. During this on-time, the rotating actuators make several revolutions while the control signal is held high, so that vibrations (pulses) output during this 125 ms are perceived by the user at the frequency of the actuator's rotation speed, not the commanded frequency. The vibration output by the device thus may not correspond with the commanded (low) frequency. This problem was not evident in the vibration produced as shown in FIG. 8, where the on-time of the control signal 184 is divided among multiple periods.

A second method of the present invention can avoid this problem at low frequencies and thus may provide a more suitable way to output vibrations for many vibrotactile devices. The second method sets the control signal high for a fixed maximum amount of time per period, not a percentage of the period. Thus, the on-time for 100% magnitude for any frequency is the same. The on-time for commanded magnitudes less than 100% are lower in proportion to the amount of the commanded magnitude under 100%. This effectively establishes a maximum on-time per period, prohibiting the actuator from coming on long enough to make multiple revolutions during one continuous on-time. If the actuator is allowed to make multiple revolutions (e.g., more than about 2 or 3 in some embodiments), the user will perceive a higher frequency (e.g., about 25 Hz for some motors) based on the rotation speed of the actuator rather than the commanded frequency (e.g., which might be less than 10 Hz), so this method prevents that result. In some embodiments, a request of 100% magnitude at a lower frequency for a particular motor can be equated with the on-time that causes the mass to rotate just under the number of revolutions that cause the user to feel more than one pulse for a single period (such as 2-3 revolutions); this on-time can be determined empirically. A drawback to the second technique is that as frequency increases, the separate on-times get closer together, and the actuator is eventually, in effect, requested to remain on for longer than one period. At that point, the control signal is always being asserted, the mass rotates continuously, and frequency and magnitude no longer vary independently.

Since the two techniques for mapping magnitude to on-time of the control signal are good for different portions of the frequency range, one preferred embodiment of the present invention combines or blends the two techniques to avoid the drawbacks in each method. In the combination method, the second method is used only when commanded frequencies are below a particular blend threshold frequency and the first method can be used for commanded frequencies above that threshold frequency. Blending is possible even if the magnitude of the control signal also varies. First, the blend threshold is chosen based on dynamics of the system; the blend frequency is the frequency at which the on-time will be the longest, so a blend frequency should be chosen that will provide one vibration pulse (e.g. less than two mass revolutions) per period for an on-time corresponding to 100% magnitude at that frequency. For example, when using the large motor/mass combination as described above, 10 Hz can be used as a blend threshold frequency. For commanded frequencies above 10 Hz, the first method ("percentage of period") is used to calculate the on-time of the control signal, and for commanded frequencies below 10 Hz, the second method ("fixed time per period") can be used. Other thresholds can be used in other embodiments. To blend the two methods, scalars are chosen so that maximum magnitude for the two methods matches at the blend threshold frequency, i.e. the transition between methods is smooth. For example, a 25 ms control signal on-time at 10 Hz may generate a 10 Hz, 100% magnitude vibration. If the commanded frequency is approaching the blend frequency from below 10 Hz, then the "percentage of period" method is scaled to generate 25 ms on-times at 10 Hz, and those scalars used are retained and applied to this method for frequencies above 10 Hz. Depending on the desired effect, more advanced blending techniques can be used such as those that mimic band pass filters in the region of the blend, or low pass/high pass combinations on either side of the blend threshold frequency.

A third method to allow the command of magnitude independent of frequency is to vary the amplitude of the control signal proportionally to requested magnitude, rather than having only two levels for the control signal. This can be performed alone or in conjunction with either or both of the first and second methods described above. For example, other types of waveforms having varying amplitude might be used as control signals (sine wave, triangle wave, etc.). One efficient way to set or vary the amplitude of the control signal is to provide pulse-width modulation (PWM) during the chosen on-time for control signals as presented above, or to vary the control signal duty cycle during the on-time using some other method. However, PWM may require a separate PWM module, which can add cost to the device. To avoid a PWM scheme, the first and second methods described above can be implemented by bit-banging, in which the local microprocessor outputs the control signal directly to the actuators without using a PWM module. Such direct control is often not feasible when using more sophisticated force feedback, but can be viable for vibrotactile feedback devices. Bit-banging does not allow the control signal magnitude to be directly controlled, but removes the requirement for a PWM module and potentially reduces processor or interface device cost.

The techniques described above for independently varying the magnitude and frequency of a vibration can be used on a single actuator or on multiple actuators simultaneously. With multiple actuators, motor/mass combinations can work together to achieve a fuller bandwidth. This is analogous to the woofer/tweeter relationship in an audio speaker. For example, the Sony Dual Shock gamepad uses two motors, and both can be used according to the present invention to reach up toward 100 Hz dynamic range. In one implementation, the large mass/motor combination can use both control techniques over its frequency range, with a blend threshold at 10 Hz. The small mass/motor combination can use only the second method ("fixed-time per period" technique) to add power to the small motor with increased frequency (since on-time does not decrease with frequency increase using the second method). This reduces the tendency of the larger amplitude vibrations of the large motor to drown out the small motor's smaller, high frequency vibrations. Again, filters can be used to achieve the desired balance between large and small motor contribution over the frequency range.

In some embodiments, such as at 5 volts, the small motor may deliver so little magnitude that the vibration is almost undetectable by the user. The frequency dynamic range can be shortened to 25 Hz by defining the device to have a maximum capable frequency of 25 Hz, choosing scalars appropriately. This allows every haptic effect to be played using the large motor, and the small motor is then unnecessary. A better 5V solution may be to increase the small ERM to a more moderate size, allowing stronger vibrations to be output.

In alternate embodiments, a more simplified control method might be used for periodic effects without using the methods described above. A commanded magnitude can be ignored, i.e. only the frequency command is used. For example, in a two-motor vibrotactile device, a predetermined threshold frequency can be used to determine which motor is used to output vibrations. For example, if a vibration above 15 Hz is commanded, the small motor/mass is rotated. The small motor/mass can be commanded with a frequency proportional to the commanded frequency, or, alternatively, may only rotated at one frequency. This effect can be used for such events as the engine of vehicle revving in a driving game. If a vibration below 15 Hz is commanded, then the large motor/mass can be rotated at a predetermined frequency or by a frequency proportional to the commanded frequency (where the commanded frequency is scaled to a frequency in the range of the large motor). This effect can be used for such events as moving over bumpy ground or collisions in a game.

Controlling Non-Periodic Effects with Vibrotactile Devices

The above-described methods are used to play fully featured periodic force effects on an ERM. Other, non-periodic kinesthetic effects, including some condition effects, may also be mapped to vibrotactile effects that can be played on vibrotactile devices.

Nonperiodic effects are determined based not on time and magnitude parameters, but on other parameters instead of or in addition to these parameters. Nonperiodic effects are not as simply mapped to vibrotactile devices as periodic effects. For example, a vector force is a non-period effect which is output in a specified direction for a specified length of time. Since vibrotactile devices generally cannot output forces in particular directions, the mapping of the vector force to a vibrotactile force sensation is not as direct as with periodic effects.

Some non-periodic kinesthetic effects are conditions. "Conditions" are closed-loop force feedback effects which can be commanded on more sophisticated kinesthetic force feedback devices, as opposed to the open-loop effects such as vibrations and jolts. Condition effects typically require position and/or velocity (and/or acceleration) data of a user manipulandum (such as a wheel, joystick, or mouse) in the determination of an output force. For example, spring condition forces are dependent on the current position of the user manipulandum and damper condition forces are dependent on the current velocity of the user manipulandum.

For the most part, conditions are appropriate for force feedback (kinesthetic) devices in which a manipulandum is moved and forces are provided in the degrees of freedom of the manipulandum. Conditions are open for interpretation when trying to display them on a solely vibrotactile-feedback device.

In one embodiment, conditions can be simply ignored, so that if an application program commands a condition force to be output, the local microprocessor of the vibrotactile device (or a driver or other program on the host) simply ignores the command and no forces are output. However, in other embodiments, conditions can be mapped to other vibrotactile sensations that allow a user to experience at least some force feedback that approximates a condition force effect or signifies an event. Descriptions of examples of mappings for non-periodic force effects follow.

Vector Forces: Vector forces are kinesthetic force effects which provide a force in a specified direction in one or more degrees of freedom of the manipulandum. For example, in a racing or driving game, a vector force is used to output a collision sensation in the rotation of a steering wheel when the car impacts an object such as a wall or other car, a shift sensation when a stickshift in moved, or a spin out sensation when the car loses control. The magnitude of the vector force is different based on the severity of the event or other factors.

In most vibrotactile devices, a directional force cannot typically be output and must be approximated using vibrations or jolts. A jolt or vibration output from a vibrotactile device, however, can be similar to a vector force. Preferably, a vibration is output having a low frequency and high magnitude; for example, a single jolt can be output by commanding a 1 Hz frequency with a duration of 1 second, to provide a single rotation. In some embodiments, commands for particular vector forces can be ignored for vibrotactile devices. For example, in a driving game, low magnitude vector forces might be ignored by the vibrotactile device since such forces are often used to provide subtle driving forces that are not easily duplicated with vibrotactile effects. In a vibrotactile gamepad device having two motors, the large motor can be caused to rotate to cause a vibration corresponding to the vector force; or both motors can be rotated.

In another preferred embodiment, a vector force can be directly mapped to a vibration, where the vibration has a magnitude corresponding to the magnitude of the vector force. The magnitude is preferably independently controlled using the methods described above with respect to periodic forces. The magnitude can be proportional to or otherwise based on the magnitude parameter of the vector force command. The frequency of the vibration can be a constant frequency predefined at a particular value; for example, the fixed frequency can be the highest frequency the device is capable of outputting. In some embodiments, the vibration frequency for vector forces can also be user selectable.

Another technique to map vector forces to vibrations is to map vector force magnitude directly to motor command, i.e. the magnitude of the vector force, as expressed by a duty cycle, is used as a command to rotate the motor, e.g. a 50% magnitude becomes a 50% duty cycle motor command. This causes a pulse of force that substitutes for the vector force. In some embodiments, instead of mapping kinesthetic vector force magnitude commands to the full range of motor amplitude commands, the vector force magnitudes can be mapped to only the upper half of the motor amplitude command range. This allows high enough magnitudes to be commanded to always cause a full mass revolution, and thus makes the feel response more linear. Alternatively, only a lower portion of the amplitude command range can be used to always provide harmonic mass motion.

In a simpler alternate embodiment, magnitude thresholds for the requested magnitude can be used to determine when and how to approximate vector forces for devices having multiple motors. For example, a first threshold can be provided at 75% magnitude (i.e., 75% of the maximum magnitude that can be output). In one example for devices having a small motor and a large motor, for vector forces between 0 and 75% magnitude, the large motor can be controlled to output a vibration (or single jolt) that has a magnitude proportional to the commanded vector force magnitude. If a commanded vector force has a magnitude of 76% to 100% of maximum, then both the large and small motors can be used to provide vibration forces having the maximum possible magnitude. It should also be noted that thresholds such as described above can be-used in conjunction with the methods used with periodics to independently control magnitude and frequency of vibrations within particular thresholds. Such combination techniques can be used with all the types of force effects described herein.

The mapping to vector forces can (in any embodiment) also be selectively applied based on the application or purpose commanded. For example, if the vector force has been output for a collision occurring in a game, the equivalent vibration forces may be appropriate. But if the vector force is being used to simulate a dynamic spring return on the steering wheel during a turn, then the vibration force may not be appropriate.

In some vibrotactile devices, directional forces may be able to be output. For example, a rotating or moving mass can be controlled to rotate so that a directional force is approximated in a particular direction of the degree of freedom of the mass. For example, in devices having multiple motors, the motors can be controlled to rotate in phase with each other to cause a force in a particular direction. In such embodiments, a vector force can be mapped to a directional force on the vibrotactile device if a force can be output in or near the direction of the vector force.

Spring Forces: Spring forces are conditions which are typically based on the formula $F=kX$, indicating that the output force F is based on the current position X of the user manipulandum in particular degree of freedom, and a spring constant k. For example, in driving games, spring forces can be used to center the steering wheel to the center position, where the user feels a force having a magnitude proportional to the amount of rotation of the wheel from the center position and in a direction towards the center position.

When mapping a spring kinesthetic force to a vibrotactile force effect, different approaches can be taken. In some circumstances, the spring command can be ignored by the vibrotactile device since the spring may not be effectively duplicated using vibrations or jolts. For example, the spring force can often be ignored when it is used to center a user manipulatable object in a degree of freedom, since a vibration or jolt would simply be distracting to the user in such a circumstance.

Alternatively, or in other circumstances, a vibration force can be output for the spring force. For example, when driving a vehicle and a turn is made, a centering spring force tends to move the steering wheel toward the center. A spring force can be output to simulate this effect for a kinesthetic device. In a vibrotactile device, a vibration can be output.

Figure 10A:
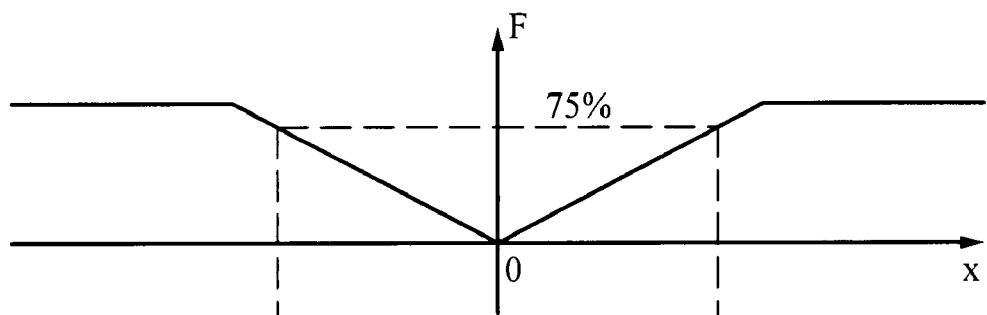
FIGS. 10a and 10b are force profiles illustrating a kinesthetic spring force and a vibrotactile sensation mapped to the kinesthetic spring force, respectively.
Figure 10B:
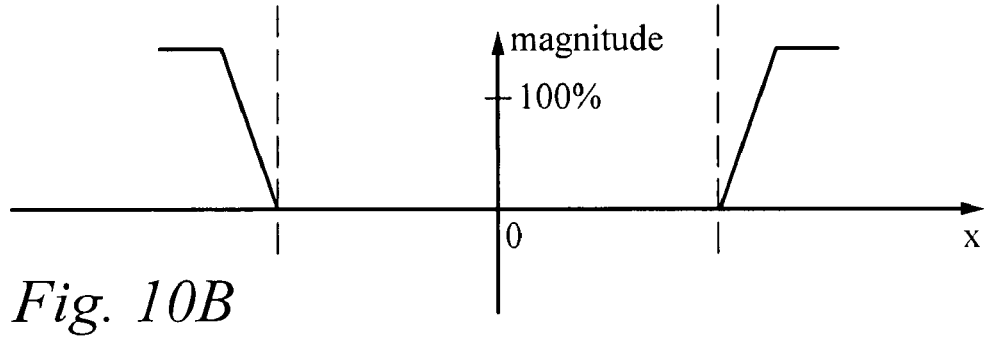

One example is shown in FIGS. 10a and 10b. FIG. 10a is a graph showing a typical spring force output on a kinesthetic force feedback device, where displacement of a manipulandum along the x-axis from the origin O causes a spring force resisting that motion to be output, having a magnitude increasing with the amount of displacement. FIG. 10b shows an example of a mapping to a vibrotactile domain. A vibration is output only above a particular spring command magnitude threshold, such as 75%, and may have a fixed, predetermined frequency (or user-selectable frequency). Thus, the vibration is output only for higher-magnitude spring commands. For vibrotactile devices having a manipulandum, such as a joystick on a gamepad, the vibration is only output at manipulandum positions (x-axis) corresponding to a 75% magnitude or greater on the spring force of FIG. 10a. For command magnitudes greater than the threshold, the vibration magnitude can be increased at a steep rate in proportion to the spring magnitude command, up to the maximum magnitude, as shown. This can be used to simulate the wobbling or shimmying of a steering wheel at high-speed turns in a vehicle; thus, the spring force effect is not directly simulated, but a different effect is output as a substitute for the spring force effect. In other embodiments, a vibration can be output for all magnitudes of the spring command (e.g., dependent on the position of the user manipulandum).

Springs (or dampers, below) can also be played as vector forces as described above, e.g. on only one motor, such as the smaller motor. This may be helpful to some users while gaming since it may provide feedback about the joystick position; however, other users may find it disconcerting. If condition forces are played on an ERM-based vibrotactile controller, the user should preferably be given the opportunity to turn them off or alter them per situation, perhaps in a profiler program presented at the application layer or other software layer on the host computer.

Obstruction forces: Obstructions such as walls are often simulated with force feedback in position control applications by using a spring force, as described in greater detail in copending patent application Ser. No. 08/664,086, incorporated herein by reference. In vibrotactile applications, an encounter with a wall or other object can be simulated using a jolt or low frequency vibration. Preferably, the force is output at close to maximum magnitude when the initial contact with the wall is made. After the initial contact, the vibration can be continued if the user-controlled graphical object (e.g. cursor, car, etc.) continues to be in contact with the wall. Or the vibration can be ramped down to an eventual zero magnitude using the control methods described above for periodic effects. Such control methods work with envelopes applied to periodic waves, such as to slowly ramp down magnitude of a vibration. Such use of periodics with attack and fade parameters are described in greater detail in U.S. Pat. No. 5,959,613 and U.S. application Ser. No. 08/846,011, both incorporated herein by reference.

Damping Forces: Damping forces are condition forces which are typically based on the formula F=Bv, indicating that the force F is based on the current velocity v of the user manipulandum in a particular degree of freedom, and a damping constant B. This force tends to subject the user manipulandum to resistance as it moves, where the faster it is moved, the greater resistance is output. For example, in a driving game, a damping force can be output on a steering wheel when the controlled car moves into a simulated pool of oil or water, indicating the sluggishness of steering in the body of liquid.

For a vibrotactile device, a damping force can be mapped to high frequency vibrations. For example, in a two-motor device, the small motor/mass can be controlled to rotate to a small degree or at a low frequency, e.g., just enough to indicate a change in the terrain type to the user in a driving game. This can simulate "sloshing" or other vibration effects such as when a vehicle moves through a liquid. In other embodiments, a damping force can be mapped to a vibration that has a magnitude in proportion to the current velocity of the controlled object (such as a vehicle or cursor), or proportional to the current velocity of a user manipulandum on the device, such as a small joystick. The vibration magnitude can be implemented as described above for periodics. In other circumstances, a damping command can be ignored by a vibrotactile device. For example, if a damping force is used to provide greater control to the user in a game, a vibration would probably not provide such greater control and should not be output.

Any other types of kinesthetic force effects can also be mapped to vibrotactile effects in similar ways as described above. For example, friction forces might be mapped using a high frequency vibration, which has a magnitude correlated with velocity of a controlled graphical object or with the velocity of the user object. Inertia forces might be mapped using low frequency or subtle vibrations to indicate the change of conditions. Texture forces provide jolts, pulses, or other forces to a user based on a manipulandum's movement through a texture field having features causing the jolts at particular locations. Such texture forces can be simulated by outputting vibrations with the ERM motor having a frequency approximately corresponding with the rate of encountering the texture features by the user. Methods for producing texture forces for some vibrotactile devices are described in copending application Ser. No. 09/504,201, filed Feb. 15, 2000 and incorporated herein by reference.

In summary, mappings are provided between kinesthetic effects and vibrotactile effects to allow a vibrotactile device to respond to full-featured application force commands. A novel control method is described to play periodics on simple ERM motors moving uni-directionally, where frequency and magnitude are varied independently. Other mappings provide compelling vibrotactile effects in place of kinesthetic effects. The end result is a control method that allows a low-cost vibrotactile product to play at least a subset of kinesthetic forces. Since conditions and other kinesthetic force effects may be greatly reduced in effectiveness or not played at all on lower-cost vibrotactile devices but are easily played on more expensive kinesthetic haptic feedback devices, this allows for product differentiation in the market. Customers are further able to choose how much haptic feedback functionality and sophistication they want based on how much they are willing to pay for a haptic feedback interface device.

Providing Consistent Force Effects Using an ERM Motor

The hardware topology shown in FIG. 4 supports all of the control schemes described above. In one embodiment, there is no sensor feedback to the host computer or local microprocessor regarding the position of the motors, i.e. the system is open loop. The control methods discussed above need no feedback regarding the positions of the motors. Since no special sensors are required to provide motor position to a controller, the open loop system allows the interface device to be very cost effective.

However, without sensors to close a feedback control loop, concern about robustness may arise. For example, it can sometimes be difficult to determine whether an ERM motor is actually spinning when it should be. For instance, some magnitude/frequency combinations can be commanded which should cause the motor to turn but may only actually cause the motor to turn if the motor were already turning. Or, the motor may not turn if the user is shaking, banging, or tilting the interface device or manipulandum in some way. Or, the motor may only turn if the user is holding the interface device in a particular orientation where gravity is less of a factor on the ERM. This can cause the same commanded force effects to feel differently to the user depending on controller or ERM orientation or other conditions. Such a result is undesired in most applications where a force effect should feel consistent each time it is commanded by an application program or other controller, regardless of how the device is held or oriented.

One method of ensuring that the mass is rotating when it should be, thereby providing consistent forces, is to model system dynamics. This method does not require feedback sensors; rather, a model of the physical system is developed beforehand and the model is used to predict the ERM's behavior. The predictions are then used to improve ERM performance as the ERM starts and continues to move. A different technique more easily implemented is to command a motor to spin at maximum magnitude for an initial period of a commanded force sensation to start the motor. This causes the motor to behave in a consistent manner if the worst case scenario is planned for, e.g. an orientation of the interface device causing the ERM to move against gravity where gravity is strongest. In such a worst case, the ERM is still forced to spin, thus allowing the commanded sensation to be output more easily once the ERM is in motion. Preferably, this initial period of maximum rotation is commanded using the "fixed time per period" technique described above for periodic force sensations. After the first period of the vibration, the output reverts to the commanded parameters that specify a particular magnitude and frequency (and if the frequency is low enough, the "fixed time per period" method is still used). No sensor or feedback loop is required for this embodiment, allowing the device to be reduced in cost.

In another embodiment, when the motor is operated in stall and it is known that the motor should rotate, voltage across the motor can be measured and fed back into an A/D converter on the local microprocessor. This signal will indicate whether the motor is stalled. This feedback loop can aid in meeting power requirements without adding much cost to the product.

Yet another technique to ensure desired operation, without the use of feedback sensors, is to carefully quantify desired motor operation over the entire frequency/magnitude domain beforehand, then maintain a counter during operation. If a haptic effect should cause the motor to fully rotate, and the counter<"max" (the maximum count value of the counter), then the counter is incremented and the requested control signal is output. If the haptic effect is known to not rotate the motor (known through empirical testing) but is desired to cause it to rotate, and the counter >0, the counter is decremented, and the requested control signal is output. If a haptic effect is in the regime (i.e. has an amplitude and frequency) where it should cause the motor to rotate but is not able to reach the activation energy to start the rotation, and the counter<max, increment the counter. The requested control signal is not output; instead, the maximum amplitude control signal is output. And, if a haptic effect is in this same regime, but the counter=max, the requested control signal is output.

Finally, in some embodiments, low-cost specifications can be relaxed and a sensor can be provided to sense the position and/or motion of the motor. The most important use for a sensor is to close a feedback loop around the actuator and ensure it is moving properly (either oscillating or spinning). A quadrature encoder on the motor shaft can be used for a sensor, but its cost and advanced functionality may be excessive for this application. Alternatively, a simple Boolean sensor, either an IR sensor blocked by the ERM, or Hall effect sensor with flux path through a steel or other metal ERM, can be used. This simple type of sensor can indicate to the local microprocessor whether the mass is making full revolutions.

For example, the sensor can be positioned at top dead center, i.e. at the point of highest travel of the mass, where gravity has the greatest adverse force against reaching this point. This ensures that the ERM triggers the sensor only when the ERM has traveled over the top and completed a full revolution, not just a large pendulum oscillation. Before a periodic effect is first started, the sensor position can be recorded and stored. After a fixed amount of time that is dependent on the inertia of the ERM and the frequency of the commanded effect, the sensor output is checked to determine if it has toggled or otherwise sensed the passage of the ERM. If the ERM has not crossed the top center position in the allotted time, the actuator force can be increased beyond the amount commanded by the periodic.

A Boolean sensor can also be used to make sure the mass is oscillating with a minimum magnitude (as opposed to rotating) by following a similar process as just described but by locating the sensor at bottom dead center. If the ERM oscillates enough to cause the sensor to toggle briefly before the ERM swings back, a minimum magnitude of oscillation can be ensured. If an encoder is used, control can become more sophisticated to further "robustify" and ensure vibration output, since the encoder has a greater resolution and can sense the ERM at many positions. A position controller can ensure that the ERM has rotated fully when it should, or that oscillations (when the ERM is not commanded to cross top dead center) are of exact magnitude.

Lastly, when using encoders for feedback, velocity control (trajectories) can be performed to convey vibration magnitude instead of controlling open-loop control signal on-times. Thus, the encoder can detect the velocity of the motor and determine whether it is at the commanded velocity. The sensed velocity is fed back to the commanding controller and the controller adjusts the command to provide the desired motor velocity.

In many embodiments, there may not be a need for such above-described mass rotation safeguards when the motor bus is run at a higher voltage. For example, a region of frequency/magnitude combinations can be identified where the ERM will spin if already spinning but will not spin up from stop. At a lower motor voltage, such as 5V, this region may be larger, placing more of a demand on rotation safeguards. One safeguard technique is to initially "kick" or pulse the rotating mass for a known amount of time (e.g., 30 ms) during the first period of any periodic effect. This ensures that the mass will spin if the force command calls for spinning; otherwise the mass will not be able to rotate past its highest position and will fall into pendulous motion. This technique, though simple, can add a significant amount of repeatability to each periodic command, no matter how the motor had been positioned or moving beforehand. The initial pulse is barely detectable to the user and helps the ERM accelerate to speed quickly. One disadvantage with this method is that some force effects having increasing envelopes may have a very low magnitude or frequency initially, and the initial kick may be too high a magnitude and/or frequency to subtly output the desired effect. Also, if the initial kick occurs too soon, the ERM may settle into a resting state before the force effect can be output.

While this invention has been described in terms of several preferred embodiments, it is contemplated that alterations, permutations and equivalents thereof will become apparent to those skilled in the art upon a reading of the specification and study of the drawings. For example, many different types of vibrotactile devices can be used with the control features of the present invention, including gamepads, remote controls, joystick handles, mice, steering wheels, grips, or other manipulandums or devices. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. A method, comprising:
   receiving information associated with an application;
   determining a periodic control signal based on the information, the periodic control signal configured to drive an actuator having a rotatable mass such that the mass rotates to produce a vibration having a magnitude and a frequency, the magnitude of the vibration being based on a duty cycle of the control signal and independent of the frequency of the vibration; and
   sending the periodic control signal to the actuator, wherein the control signal has at least one of an on time and an off time, the on-time of the control signal being associated with the magnitude of the vibration, the on-time of the control signal is determined based on a selected frequency of the vibration, if the selected frequency is below a predetermined threshold frequency, the on-time is determined using a first method, and if the selected frequency is above the predetermined threshold frequency, the on-time is determined using a second method.

2. The method of claim 1, wherein the on-time is determined as a percentage of a period of the vibration if the selected frequency is below the predetermined threshold frequency and the on-time is determined as a predetermined amount of time for each period of the vibration if the selected frequency is above the predetermined threshold frequency.

3. The method of claim 2, wherein the percentage is proportional to a desired magnitude of the vibration.

4. The method of claim 1, wherein the actuator is disposed within a gamepad controller, the application associated with a host microprocessor of a host computer, the vibration is correlated with at least an event and an interaction occurring within a graphical environment of the application.

5. The method of claim 1, further comprising: monitoring a position of the mass about the axis of rotation so that the mass rotates in response to the control signal.

6. The method of claim 1, the information being associated with a kinesthetic effect, the method further comprising: mapping from the kinesthetic effect to a vibrotactile effect based on the information to produce the control signal.

7. The method of claim 1, the information being associated with a kinesthetic effect, the method further comprising: mapping from the kinesthetic effect to a vibrotactile effect based on the information to produce the control signal, the actuator being disposed within a haptic feedback device having a local microprocessor, the mapping being performed by the local microprocessor.

8. The method of claim 1, the information being associated with a kinesthetic effect, the method further comprising: mapping from the kinesthetic effect to a vibrotactile effect based on the information to produce the control signal, the actuator being disposed within a haptic feedback device having a local microprocessor, the mapping being performed by the local microprocessor, the gamepad controller including a joystick having two degrees of freedom and configured to provide input to the host computer when manipulated.

9. The method of claim 1, further comprising: sending an initial control signal to the actuator, the mass initiating rotation before initiation of the vibration.

10. The method of claim 1, wherein the actuator is one of a plurality of actuators disposed within a haptic feedback device, each actuator from the plurality of actuators is individually controllable to collectively produce the vibration.

11. The method of claim 1, wherein the control signal is modified by envelope parameters received from a host computer, the envelope parameters modifying the magnitude of the vibration.

12. The method of claim 1, wherein the information includes a high level command and at least one parameter, the actuator being disposed within a vibrotactile interface device having a local microprocessor separate from a host microprocessor, the local processor configured to parse the high level command.

13. The method of claim 1, wherein the information includes a high level command and at least one parameter, the high level command is a vibration command, the at least one parameter includes a magnitude parameter and a frequency parameter associated with the vibration.

* * * * *